July 15, 1941.   W. NÜRNBERG   2,249,490
CURRENT RESPONSIVE DEVICE
Filed Nov. 27, 1939
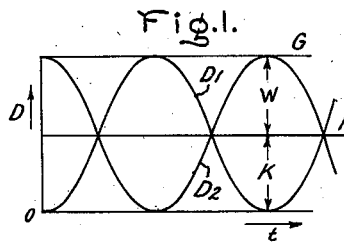
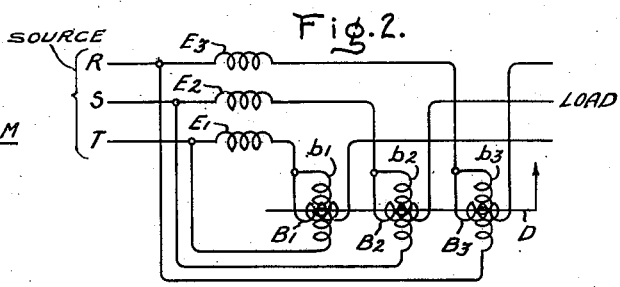
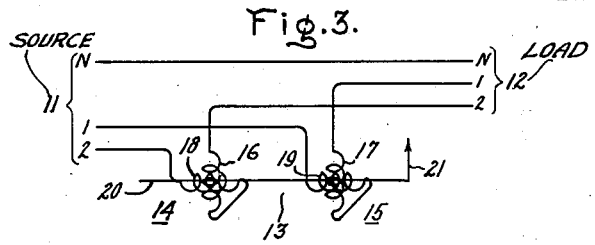
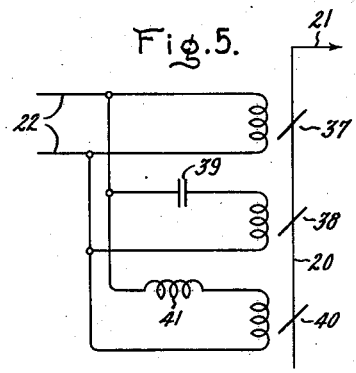
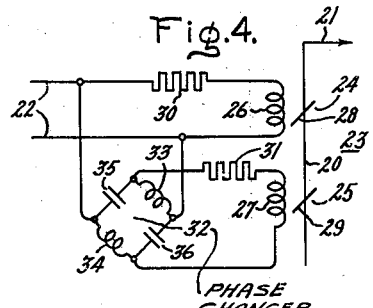
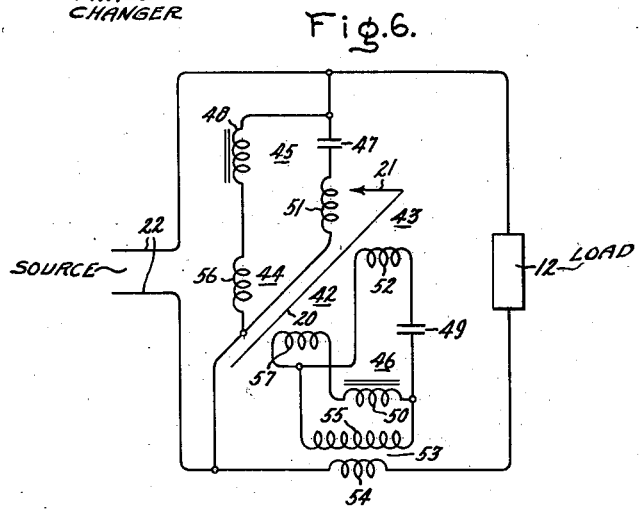
Inventor:
Werner Nürnberg,
by Harry E. Dunham
His Attorney.

Patented July 15, 1941

2,249,490

UNITED STATES PATENT OFFICE 2,249,490

CURRENT RESPONSIVE DEVICE

Werner Nürnberg, Berlin-Weissensee, Germany, assignor to General Electric Company, a corporation of New York Application November 27, 1939, Serial No. 306,393
In Germany December 6, 1938

4 Claims. (Cl. 171—95)

My invention relates to current responsive devices and concerns particularly electrical measuring instruments for relatively low-frequency alternating-current circuits.

It is an object of my invention to eliminate or minimize oscillations of the pointer of an electrical measuring instrument used in an alternating-current circuit having a frequency relatively low in comparison with the inertia of the instrument.

Other and further objects and advantages will become apparent as the description proceeds.

Electrical measuring instruments used for alternating-current circuits whether of the electromagnetic or electrostatic type tend to follow the square law, and the torque acting between the stationary and movable elements tends to vary as the square of the current applied to the coil or coils of the instrument, subject to certain modifications which may take place and depend upon saturation where soft iron is employed, or upon the angular position of the movable element, in case of certain geometrical relationships between the elements of the instrument. As is well known, the product of two sinusoidal alternating quantities of a given frequency or the square of an alternating quantity is another alternating quantity of double frequency. Consequently the torque acting in alternating-current instruments actually varies between zero and a maximum, or in some cases, between a maximum negative value and a maximum positive value.

In the case of ordinary commercial frequencies heretofore employed, the torque fluctuation is not objectionable since the movable elements of ordinary commercial instruments have sufficient inertia to be substantially unaffected by the torque fluctuations. However, in the case of measurements of relatively low alternating-current circuits, such as circuits having a frequency of the order of three cycles per second, for example, the torque fluctuation becomes troublesome as the pointer of the instrument tends to oscillate between zero and the maximum value making it impossible to determine the effective value of the quantity to be measured. For the purpose of overcoming these pointer oscillations I utilize a plurality of instrument units instead of only one instrument unit and I make the electrical relationship between units such that the current applied thereto and consequently the torques acting therein, are out of phase with one another and the fluctuations in the torque acting in one unit are compensated by the opposite fluctuations in torque in the other unit or in the remaining units. The invention may be employed in connection with the measurement of any of the usual classes of alternating current quantities such as current, voltage or power, for example.

The invention will be understood more readily from the following detailed description when considered in connection with the accompanying drawing, and those features of the invention which are believed to be novel and patentable will be pointed out in the claims appended hereto.

In the drawing Fig. 1 is a graph illustrating the principle of operation of my invention as applied in a two-unit instrument. Fig. 2 is a circuit diagram of a three-unit, three-phase ammeter forming one embodiment of my invention. Fig. 3 is a circuit diagram of a two-unit, two-phase ammeter forming another embodiment of my invention. Fig. 4 is a circuit diagram of a single-phase voltmeter. Fig. 5 is a circuit diagram of a modified form of a single-phase instrument, and Fig. 6 is a circuit diagram of a wattmeter for low-frequency alternating-current circuits forming another embodiment of my invention. Like reference characters are utilized throughout the drawing to designate like parts.

If current is to be measured in a two-phase alternating-current circuit of low frequency even though the system is such that the currents in the phases are balanced, I prefer to utilize an ammeter consisting of two units for measuring the current and I connect the movable elements of the units together mechanically, as shown, for example, in Fig. 3. In Fig. 3 an electrical system is illustrated consisting of a two-phase source of alternating current 11 having a neutral terminal N and a pair of terminals 1 and 2 representing the two phases, with two conductors running from the terminals N, 1 and 2 to a load 12 having terminals correspondingly designated N, 1 and 2. For measuring the current applied to load 12 I employ an instrument 13 consisting of two units 14 and 15, each having a stationary element and a movable element. The units may be of any suitable type, for example, they may be of the dynamometer type in which the stationary elements consist of current conducting coils 16 and 17, respectively, and the movable elements consist of movable coils 18 and 19, respectively. The movable elements 18 and 19 are mechanically connected and are carried, for example, on a common shaft 20 to which a pointer 21 is connected, cooperating with a scale, not shown. It will be understood that the units 14 and 15 are represented schematically, and actually consist of coils of circular or other suitable shape arranged, for example, so that the movable coil may rotate within the stationary coil about an axis passing diametrically through both coils.

The current of line 1 of the electrical system passes through the coils 17 and 19 of the unit 15 in series, and the current of line 2 of the electrical system passes through the coils 16 and 18 of the instrument unit 14 in series. The torque in each unit is proportional to the product of an A. C. current and an alternating flux produced thereby. Accordingly, double frequency torques are produced in each of the instrument units. Since the units are connected in a two-phase system, the current acting in the instrument unit 14 is displaced 90 degrees from the current acting in the instrument unit 15. The double frequency torques are displaced in time phase an amount representing 90 degrees of the fundamental-frequency wave or 180 degrees of the double-frequency wave, i. e., in phase symmetry, as illustrated in Fig. 1. The curves shown in Fig. 1 represent the variations in instantaneous value of torque with time. The torque is plotted along the vertical or D axis and time is plotted along the horizontal or $t$ axis. Fig. 1 represents the condition when the line currents are balanced and the frequency is uniform. The line currents are balanced when the loads in each phase are balanced and have the same power factor. Accordingly, the phase relationships between the currents remain substantially constant. The torque $D_1$ acting in the instrument unit 14 is seen to fluctuate in accordance with a sinusoidal curve (sinusoidal currents having been assumed) fluctuating between the minium zero and the maximum value, G, with the average value M. Similarly, the torque $D_2$ acting in the instrument unit 15 fluctuates sinusoidally between the same limits and with the same average value, but displaced 180 degrees or symmetrically from the torque curve $D_1$. As shown by the graph, the portions of the torque curve W above the average value M are equal and opposite to the portions of the torque curve K below the average value M, and the resultant of the two torque curves $D_1$ and $D_2$ is the constant value G equal to twice the average value M of either of the torque curves. There is thus no tendency for the pointer to oscillate. In case the phases were unbalanced the resultant of the two torque curves $D_1$ and $D_2$ would not be equal to twice the average value of either of the torque curves.

Oscillation of the pointer can be overcome in a similar manner in three-phase and other polyphase circuits by utilizing a number of instrument units corresponding to the number of phases and connecting all the movable elements together mechanically. It will be understood that in the case of a three-phase system, for example, the three torque curves corresponding to the torque curves $D_1$ and $D_2$ will be symmetrically displaced 120 degrees from one another, and the resultant will be a constant value equal to three times the average value of any one of the fluctuating torques. In case the currents in the phases in the alternating current system are not exactly balanced, perfect compensation will not be obtained, but even in this case the oscillation of the pointer will be reduced to a negligible value depending on the degree of unbalance of the phases.

Although I have described the invention in connection with polyphase circuits, it will be understood that it is not limited thereto and is equally applicable to prevention of pointer oscillation in single-phase circuits. For single-phase circuits phase-splitting arrangements are employed. For example, an instrument may be utilized consisting of the usual instrument unit connected directly to the circuit in which an electrical quantity is to be measured and one or more similar additional instrument units connected to phase shifters. In case of badly unbalanced polyphase circuits such single-phase assemblies may be connected in each of the phases of the polyphase system for the purpose of obtaining oscillation-free indications when comparing the loading of the respective phases.

In the arrangement of Fig. 4 in which I have shown an instrument taking the form of a voltmeter 23 for measuring the voltage across a single-phase source 22, the instrument 23 consists of a pair of units 24 and 25. In this case the instrument units are represented as being of the Thomson inclined-coil type described more in detail in United States Patent 542,663, Thomson, and the units consist of stationary inclined coils 26 and 27, within which inclined vanes 28 and 29, respectively, are movably mounted. For the sake of simplifying the drawing the units have, however, been shown only conventionally in Fig. 4. The movable elements 28 and 29 are connected to a common shaft 20, as in the arrangement of Fig. 3. The stationary coil 26 is connected across the line 22 in series with the current-limiting resistor 30, and the stationary coil 27 in series with a corresponding current-limiting resistor 31 is connected to the source 22 through a phase shifter 32, of any suitable type, for causing a quadrature relationship between the voltages applied to the two instrument units. The phase shifter 32 may, for example, take the form of a pair of inductances 33 and 34 and a pair of condensers 35 and 36 connected in bridge relationship with one pair of opposite corners of the bridge connected across the source 22 and the remaining pair of opposite corners of the bridge connected to the instrument coil 27. It will be seen that the arrangement of inductances and condensers is such that the inductances form arms adjacent to the condenser arms, and the opposite arms of the bridge are either inductances or condensers.

In Fig. 5 a modified form of instrument is shown in which the desired phase difference between the currents in the instrument coils is obtained by connecting suitable reactances in series with an auxiliary instrument coil or coils. For example, if pure capacitance or pure inductance is connected in series with the coil of the auxiliary instrument unit the desired quadrature relationship would be obtained with respect to the main instrument unit connected directly across, or in series with the line. In case it should be impracticable to obtain a full quadrature relationship in this manner I may split the phases between two units by using inductance in one and capacitance in the other, or I may employ two additional instrument units, as shown in Fig. 5. In this case, the main instrument unit 37 is connected directly to the line 22, there is a second instrument unit 38 which has sufficient capacitance 39 connected in series with it to introduce a voltage lag of approximately 60 degrees, and there is an instrument unit 40 which has a sufficient inductance 41 connected in series with it to introduce a current lag of approximately 60 degrees; the movable elements of the three units being connected to the common shaft 20, as previously explained. Inasmuch as the torques are of double frequency the current and voltage lags of 60 degrees are the equivalent of symmetrical 120 degree differences in the phase of the currents, and in the double frequency torques the three units will be 120 degrees apart causing the fluctuations in the torque of the main unit 37 to be compensated.

It will be understood that in order to obtain the most nearly perfect compensation it is desirable to employ instrument units which have relatively uniform scales and in which the torque produced depends upon the current, but is relatively independent of the angular position of the movable element with respect to the stationary element. For example, in the case of dynamometer instruments, such as shown in Figs. 2 and 3, the relative diameters of the fixed and movable coils should be properly proportioned to produce substantially uniform scales. This may be done by making the ratio of the movable and stationary coil diameters approximately .548, as described more in detail on page 80 of "Electrical Measurements," by Frank A. Laws, 1917 edition, or in an article by Lord Rayleigh "The Inductance and Resistance of Compound Conductors," Philosophical Magazine for December 1886, page 470.

In Fig. 2 is illustrated a three-phase ammeter in use with a three-phase system having lines R, S, and T. In this case the instrument units are of the dynamometer type and consist of stationary coils $B_1$, $B_2$ and $B_3$, respectively, connected in series with the lines T, S and R, and movable coils $b_1$, $b_2$ and $b_3$ connected across current shunts $E_1$, $E_2$ and $E_3$ connected in series with the lines T, S and R, respectively. The three movable coils are connected to a common shaft D. The movable coils in this case consist of relatively large numbers of turns of fine wire, as in wattmeters, so that ordinary wattmeter units with their movable elements connected together may be employed for measuring current, as illustrated in Fig. 2.

The problem of oscillation of the pointer at low frequency occurs also in wattmeters for the reason that the torque acting in a wattmeter is the product of an alternating current and an alternating voltage or the product of two alternating currents proportional to line voltage, and line current, respectively, and the product is a double-frequency alternating value. In order to obtain a constant resultant torque acting on the instrument pointer I may employ a plurality of wattmeter units with the units so connected that the currents in the coils of the respective units are symmetrically displaced in phase, as described in connection with the ammeters and voltmeters illustrated in the previously mentioned figures. In the case of single phase I may utilize an arrangement, such as illustrated in Fig. 6 in which a wattmeter 42 is shown for measuring the power supplied to a load 12 by a single-phase alternating source 22. The wattmeter 42 includes a pair of units 43 and 44 with potential and current coils connected across and in series, respectively, with the line through phase splitters 45 and 46. The potential phase splitter consists of a condenser 47 and an inductance 48, and the current phase splitter consists of a condenser 49 and an inductance 50. The instrument unit 43 includes a potential coil 51 connected across the load 12 and a current coil 52 connected in series with the load 12 through the condensers 47 and 49, respectively.

Preferably, however, a current transformer 53 is interposed in the current converters and is designed for a relatively high ratio of transformation between a primary winding 54 and a secondary winding 55, in order to provide a high secondary voltage and diminish the size and expense of the reactances of the current phase splitter 46. The instrument unit 44 has a potential coil 56 connected across the load 12 through the inductance 48, and a current coil 57 connected in series with the load 12 indirectly by being connected to the current transformer secondary winding 55 and is in series with the inductance 50. The potential coils 51 and 56 are movable, but are connected to a common shaft 20. The phase splitters 45 and 46 are so designed as to introduce approximately 45° lag in the currents of the unit 44 and approximately 45° lead in the currents of the unit 42, so that a quadrature relation is introduced. In accordance with the principle previously explained, it will be apparent that the double frequency torque acting upon the unit 43 will be displaced 180 degrees in phase from the double frequency torque acting in the unit 42 and the resultant will be a constant torque causing the pointer of the instrument to take up a steady position.

I have herein shown and particularly described certain embodiments of my invention and certain methods of operation embraced therein for the purpose of explaining its principle and showing its application, but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. A measuring device for low-frequency alternating current circuits comprising a plurality of current responsive units in which double frequency torques are produced varying in peak magnitude in dependence upon variations in the electrical quantity to be measured, all of said units being of the same type and design and connected for measuring the same class of electrical quantity, and connections for applying the electrical quantities to said units with different phase relationships in phase symmetry to neutralize the said double frequency torques, said units each comprising stationary and movable elements, all the latter being mechanically connected to aid each other.

2. A current responsive device for low-frequency polyphase alternating current circuits comprising for each of the phases of the circuit a current responsive unit in which double frequency torque is produced varying in peak magnitude in dependence upon variations in the electrical quantity to be measured, each of said units being of the same type and design and connected for measuring the same class of electrical quantity, and connections for applying the electrical quantities of the phases of the circuit to said units whereby the electrical quantities applied are in phase symmetry and neutralize the said double frequency torque, each unit being connected to a different one of the phases, said units each comprising stationary and movable elements, all the latter being mechanically connected to aid each other.

3. A wattmeter for low-frequency alternating-current circuits comprising a plurality of wattmeter units in which double frequency torques are produced, phase splitting connections for connecting said units to the electrical circuit in which power is to be measured with different phase relationships in phase symmetry to neutralize the said double frequency torques, said units each comprising stationary and movable elements, the latter being mechanically connected to aid each other.

4. A measuring device for a low-frequency single-phase alternating-current circuit comprising a plurality of current responsive units in which double-frequency torques are produced varying in peak magnitude in dependence upon variations in the electrical quantity to be measured, all of said units being of the same type and design and connected for measuring the same class of electrical quantity, phase-splitting connections for applying an electrical quantity to said units with different phase relationships between units in phase symmetry to neutralize the said double frequency torques, each unit comprising stationary and movable elements, the latter being mechanically connected to aid each other.

WERNER NÜRNBERG.